July 27, 1965

F. P. ANDERSON 3,196,610

SOLID PROPELLANT ROCKET MOTOR HAVING
REVERSE THRUST GENERATING MEANS

Filed May 3, 1963

Frank P. Anderson
INVENTOR.

BY *Rob't L. Williams*
Attorney

July 27, 1965

F. P. ANDERSON 3,196,610

SOLID PROPELLANT ROCKET MOTOR HAVING
REVERSE THRUST GENERATING MEANS

Filed May 3, 1963

Frank P. Anderson
INVENTOR.

BY *Robt L. Williams*
Attorney

3,196,610
SOLID PROPELLANT ROCKET MOTOR HAVING REVERSE THRUST GENERATING MEANS
Frank P. Anderson, Brigham City, Utah, assignor to Thiokol Chemical Corporation, Bristol, Pa., a corporation of Delaware
Filed May 3, 1963, Ser. No. 277,745
3 Claims. (Cl. 60—35.54)

This invention relates to a rocket motor and, more particularly, to a means of generating a thrust in opposition to the primary thrust of a solid propellant rocket motor.

In a solid propellant rocket motor, the hot gases created by the combustion of the propellant charge are exhausted through one or more nozzles to provide the thrust. The thrust of the rocket engine can be used to propel a ballistic missile until its proper velocity is reached. The thrust of a solid propellant rocket motor continues until substantially all of the propellant is consumed or the combustion of the charge is extinguished. Rapid termination of the thrust of a solid propellant rocket motor when the ballistic missile achieves a predetermined position in its flight and/or velocity of flight is, therefore, extremely difficult. Failure to terminate the thrust quickly enough will cause the missile to miss the target. Further, to separate the motor from its missile payload, which normally is a warhead with or without additional propulsion units, it is desirable not only to terminate the forward thrust of the motor but to produce a thrust in the opposite direction. There was no effective means of providing such changes in the overall thrust of solid propellant rocket motors.

It is, therefore, an object of the present invention to provide a means for generating a thrust in opposition to the primary thrust of a solid propellant rocket motor.

It is a further object of this invention to produce a solid propellant rocket motor wherein a part of the gases providing the primary thrust can be rapidly diverted to create a thrust in opposition to said primary thrust.

Other objects of the invention will become apparent from the following text and the appended drawings wherein.

The objects of the invention have been achieved generally in accordance with this invention by a rocket motor nozzle arrangement which provides at a predetermined time an almost instantaneously developed thrust in opposition to the primary thrust. In this arrangement, one or more auxiliary nozzles are connected to the reaction chamber of the rocket motor and, when open, partially divert the combustion gases from the primary thrust stream to a direction opposed thereto. Each of these nozzles is opened by rupture of its rupturable diaphragm according to a predetermined program. It is a feature of the invention that the rupturable diaphragm of each of the reverse thrust nozzles is convex relative to the combustion chamber so as to better withstand the pressure of the combustion gases.

Figure 1:
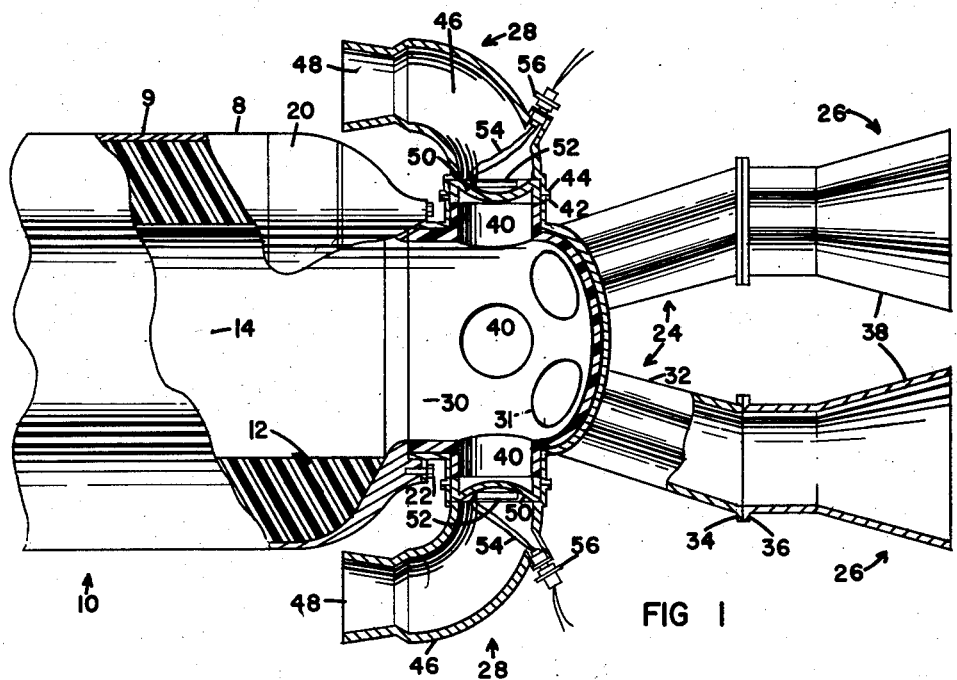
FIGURE 1 is a side elevation of the aft end portion of a rocket motor, partially broken away, along the line 1—1 of FIGURE 2 to show part of the propellant charge and the intact interior of two of the reverse thrust nozzles.

In FIGURE 1, there is shown the aft portion 8 of a thin cylindrical motor casing 9 of a rocket motor 10. An annular body of solid propellant 12 is cast in and bonded to the interior surface of the motor casing 9. The interior surface 14 of the propellant 12 defines the initial combustible surface which can be ignited by conventional means not forming a part of this invention. The aft end of the cylindrical motor casing 9 is provided with an adapter ring 20, which is secured by bolts 22 to the nozzle assembly 24. The nozzle assembly 24 consists of four primary thrust nozzles 26 (two are hidden) and four reverse thrust nozzles 28 (only two are shown and in section). Each primary thrust nozzle 26 extends from the plenum chamber 30 as a cylindrical duct 32 whose external flange 34 is connected to the flange 36 of the partially cylindrical, partially truncated conical posterior nozzle segment 38.

The plenum chamber 30 is lined with a plastic liner 31 and has four (one not shown) radially extending necks 40. Each plenum chamber neck 40 is connected by a flange 42 to a flange 44 of its respective reverse thrust nozzle 28. The nozzle 28 is composed of a curved duct portion 46 and a frusto-conical section 48. Closing the passage defined by nozzle 28 is a rupturable diaphragm 50 located adjacent to and extending convexly into the plenum chamber neck 40. The rupturable diaphragm 50 is convexo-concave as shown although it might be plano-convex. It has been proven desirable to use a rupturable diaphragm, which has a physical dimension highly resistant to the compressional forces developed on its interior surface (the surface facing the plenum chamber 40, yet easily fractured by compressional forces on its exterior surface. The convexo-concave structure meets this requirement. Positioned on the concave surface of the diaphragm 50 is the means 52 for rupturing the diaphragm 50 at a predetermined instant. Extending from this means 52 are wires which lead to connector 56.

Figure 2:
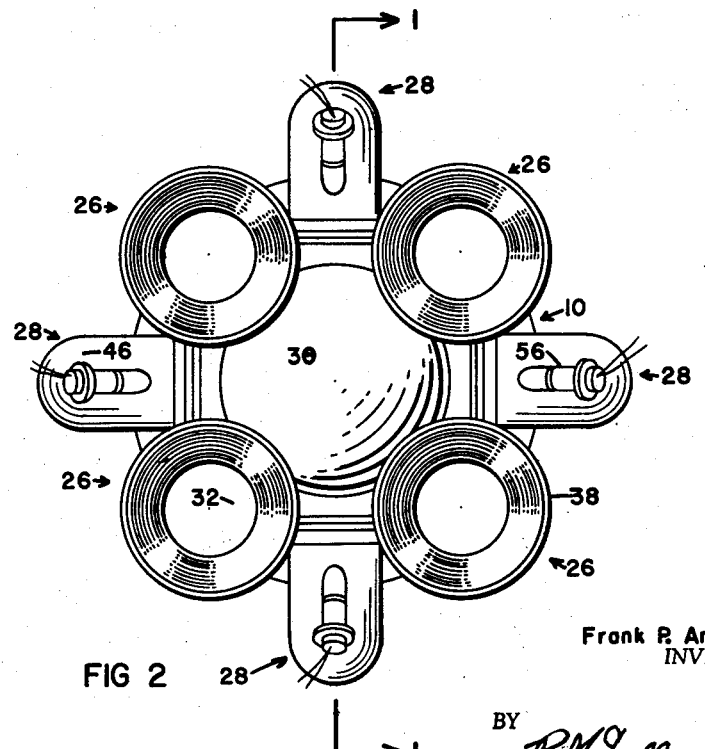
FIGURE 2 is an aft end elevation of the motor of FIGURE 1 showing the relative locations of the primary thrust nozzles and the reverse thrust nozzles.

In FIGURE 2, the relative locations of the primary thrust nozzles and the reverse thrust nozzles is shown. The axes of segments 38 fall in a circle whose midpoint is on an extension of the longitudinal axis of the rocket motor.

Figure 3:
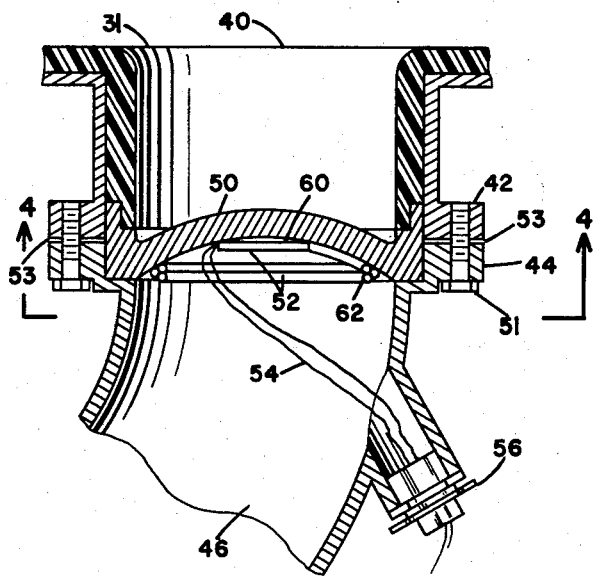
FIGURE 3 is an enlarged vertical section of a closed reverse thrust nozzle showing the rupturable diaphragm and the means for rupturing it.

Reference should now be made to FIGURE 3 which shows the diaphragm 50 and its rupturing means 52 in an enlarged view. The diaphragm 50 is held in position by the pressure of bolts 51 which connects the duct flange 44 to the plenum chamber neck flange 42 with a gas tight seal being achieved between the flanges 42 and 44 by means of an annular gasket 53.

The diaphragm 50 has secured to its concave surface three turns of primacord 62 connected to blasting caps 60. The blasting caps 60 are connected by wires 54 to connector 56 which provides for exit of the wires 54 from the reverse thrust nozzle 34 to the actuating means (not shown) for exploding the blasting caps 60 and the primacord 62. The actuating means can be any of a number of well-known devices which would supply current to the wires, 54 e.g., it can be the combination of a radio-controlled switch and a battery. Upon receipt of a certain signal from a control located in the missile, in a plane, or at a ground station, the switch in the missile would be closed causing current to flow in wires 54. This current flow actuates the blasting caps 60, thereby detonating the primacord 62 which results in a compressional shock wave rupturing the rupturable diaphragm 50. The debris from the rupturable diaphragm 50 would be blown from the plenum chamber 30 out through reverse thrust nozzle 28 by the partial diversion of the combustion gases through the now open nozzle 28.

Figure 4:
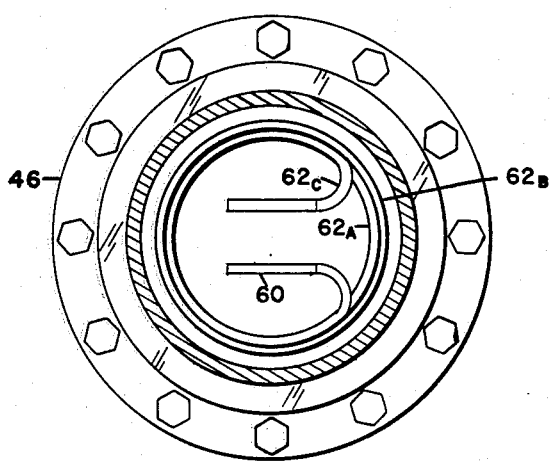
FIGURE 4 is an axial section of a closed reverse thrust nozzle along the line 4—4 of FIGURE 3.

In FIGURE 4, an axial section of nozzle 28 shows the rupturable diaphragm 50 with the primacord 62 and blasting caps 60 positioned on its concave surface. The primacord 62 consists of three turns 62A, 62B, and 62C and is connected to blasting caps 60. The primacord's composition is 40 grains or more per foot of cyclotrimethylenetriamine or pentaerythritoltetranitrate. It has been found preferable, to avoid rupture of the reverse thrust nozzle 28 and the plenum chamber 30, to limit the maximum diameter of the primacord turns 62A, 62B, and 62C to about 90 percent of the diameter of the plenum chamber neck 40 when the turns 62A, 62B, and 62C are coaxial with the neck 40.

Figure 5:
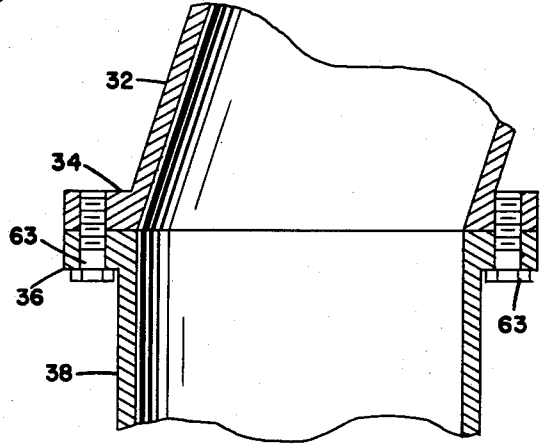
FIGURE 5 is an enlarged fragmentary vertical sectional view showing the manner in which the primary thrust nozzles are secured to the cylindrical ducts extending from the plenum chamber.

In the enlarged fragmentary sectional view of FIGURE 5, there is shown the manner in which the flange 34 of the cylindrical duct 32 is connected to the flange 36 of the segment 38, FIGURE 1, by means of bolts 63. Thus, the nozzles 28 and the segments 38 may be connected to their associated parts before or after the adapter ring 20 is secured in place by its bolts 22.

Referring now to FIGURE 2, the primary thrust nozzles 26 as previously discussed are four in number as are the reverse thrust nozzles 28. The locus of the axes of the reverse thrust nozzles 28 form a circle, concentric to that formed by the axes of the primary thrust nozzles 26. It is within the scope of this invention to utilize any number of primary thrust nozzles and reverse thrust nozzles. The dimensions and number of the primary thrust nozzles are determined by the propulsive force required, the character of the flight, and other factors well known to rocket propulsion engineers. The number, dimensions, locations, and directions of thrust of the reverse thrust nozzles are determined by the flight program of the missile. The rupture of the diaphragms of the reverse thrust nozzles may be programmed over a period of time or simultaneously, depending on the flight requirements.

Prior to take-off of the rocket-motor propelled missile, the rocket motor has the construction of FIGURE 1. The motor is started by ignition of the solid propellant 12 encased in the motor casing 9. The gases resulting from the combustion of the solid propellant pass through the plenum chamber 30 and the primary thrust nozzles 26 providing the thrust of the motor. The propelled missile becomes airborne and attains the appropriate flight pattern. When the missile reaches a predetermined velocity and position of flight, a signal is transmitted which results in current flow to the blasting caps—primacord arrangement positioned on the rupturable diaphragm 50 of the reverse thrust nozzles 28. The resulting explosion ruptures the diaphragm 50 and the debris of the diaphragm is thrown outward by the combustion gas discharge from the opened reverse thrust nozzles 28. The nozzle 28, being no longer closed by the diaphragm 50, a diversion of a part of the combustion gases through the nozzle 28, produces a thrust opposed to the primary thrust, and thus the forward thrust from nozzles 28 opposes the rearward thrust nozzles 26. The reduction of overall thrust is sufficient to prevent further acceleration of the missile so that the proper terminal velocity is achieved. Alternatively the rocket motor can be separated from the payload of the missile which can be best achieved by a reduction in overall thrust so as to decelerate the motor once it is no longer mechanically bound to the residue of the missile. Other variations of this are apparent as, for example, programming a stepwise reduction in overall thrust during flight by opening at a given instant only a part of the reverse thrust nozzles.

In the manufacture of rocket motors, the ease with which the motor casing is produced is important as to availability of cases when the need arises. In the matter of casting and curing the solid propellant, ease of handling the motor casing, as well as the storage thereof, is important. The difficulties which would arise in the handling of the motor casing if the nozzles 28 were formed integrally with the motor case 9 is overcome by the manner in which the rocket motor embodying the invention is assembled. The motor casing 9 of the subject invention can have the solid propellant 12 cast and cured therein; and when the solid propellant 12 is in condition for operation, the nozzle assembly 24 can be connected to the aft end of the motor casing 9 by bolts 22. Thus, nozzle assembly 24, with the primary and reverse thrust nozzles 26 and 28 thereon, does not have to be handled until the rocket motor is to be assembled and fired.

The difficulty of handling the rocket motors that are not assembled as the motor of the instant invention would require additional equipment and an enlarged or entirely different arrangement for storage and for curing than the equipment and arrangement in conventional use at the present time.

It is apparent, therefore, that, while the operation of a rocket motor that is not assembled as is the instant motor may be similar to the operation of the instant motor, the advantages possessed by the instant motor as to ease of manufacture and ease of assembly, storage, etc., far outweigh the fact that the operation of both types of rocket motors previously referred to are similar.

The instant invention does not depend for novelty on the use of a plurality of nozzles but depends on the mode of operation as well as the mode of assembly and manufacture. It is not believed, therefore, that rocket motors that may be assembled in an entirely different manner than is the instant rocket motor will possess the advantages inherent with the rocket motor of the instant invention.

The positioning of the diaphragm 50 of the instant invention does not require that the nozzle 28 be of a high-heat resistant material to prevent damage thereto during the operation of the rocket motor, since the diaphragm 50 is at the point of connection between the neck 40 and the nozzle 28, thus the nozzle 28 does not have to be built of a heavy gauge material and the weight of the rocket motor can be reduced to create higher efficiency in operation.

While I have described my invention in detail in its present preferred embodiment, it will be obvious to those skilled in the art, after understanding my invention, that various changes and modifications may be made therein without departing from the spirit or scope thereof.

I claim:

1. A rocket motor comprising a cylindrical casing having a forward end and an aft end and containing a propellant charge, an adapter ring on the aft end of said casing, first nozzle means detachably connected to the adapter ring on the aft end of said casing and directed rearwardly to provide a primary thrust for said motor when said propellant charge is ignited, said first nozzle means comprising a plurality of cylindrical ducts that are integral with, and diverge outwardly from, said aft end, each of said ducts having an external flange thereon, a plurality of partially cylindrical and partially truncated conical posterior nozzle segments, each of said nozzle segments having an external flange thereon that is rigidly secured to the flange on the said duct with which it is operatively associated, second nozzle means connected to said casing and directed forwardly to provide a secondary thrust axially opposing and counteracting said primary thrust at a predetermined time during burning of said propellant charge, said second nozzle means comprising a plurality of radially extending necks that are integral with said aft end, each of said necks having an external flange thereon, a plurality of forwardly directed nozzles, each of said nozzles having an external flange thereon, that is rigidly secured to the flange on the said neck with which it is operatively associated, the axis of said second nozzle means lying in a circle whose midpoint is on an extension of the longitudinal axis of the rocket motor and said circle is concentric to a second circle formed by the axis of said primary thrust nozzles, rupturable closure means constructed and arranged within each of said necks and each of said nozzles in alinement with the flanges thereon to close said second nozzle means and means positioned in each of said nozzles outwardly of said closure means for rupturing said closure means at said predetermined time to initiate said opposing and counteracting thrust.

2. A rocket motor comprising a cylindrical casing having a forward end and an aft end containing a solid propellant charge, said aft end including a plenum chamber, four primary thrust nozzles detachably connected to said plenum chamber and directed rearwardly to provide a primary thrust for said motor when said propellant charge is ignited, said primary thrust nozzles positioned so that their centers fall on a circle whose midpoint is on an extension of the longitudinal axis of said casing, a plurality of detachable auxiliary nozzles radially connected to said plenum chamber and directed forwardly to provide a thrust axially opposing said primary thrust at a predetermined time during burning of said propellant charge, rupturable closure means disposed within and closing said auxiliary nozzles, said means comprising a concavo-convex diaphragm which is positioned in said auxiliary nozzles with the convex surface thereof exposed to said plenum chamber and an explosive means comprising a plurality of turns of primacord connected by blasting caps positioned on the concave surface of said closure means for rupturing said closure means at said predetermined time to initiate said opposing thrust.

3. The rocket motor of claim 2, wherein said plenum chamber is provided with a plastic liner that is provided with a plurality of ports that are in alinement with said primary thrust nozzles and said auxiliary nozzles.

References Cited by the Examiner
UNITED STATES PATENTS

| | | | |
|---|---|---|---|
| 2,761,279 | 9/56 | Smith | 60—35.6 |
| 2,776,623 | 1/57 | Bonner | 60—35.6 X |
| 2,797,760 | 7/57 | Mathisen | 220—89 X |
| 2,850,976 | 9/58 | Seifert. | |
| 3,038,303 | 6/62 | Gose. | |
| 3,099,959 | 8/63 | Bowersett. | |

OTHER REFERENCES

Baker, N. L., Complication for Solids: Thrust Direction Control, in Missiles and Rockets, February 9, 1959, pages 23–25.

MARK NEWMAN, *Primary Examiner.*

SAMUEL LEVINE, *Examiner.*